United States Patent
Troxler et al.

(10) Patent No.: US 11,480,097 B2
(45) Date of Patent: Oct. 25, 2022

(54) TURBOCHARGER INCLUDING A TURBINE HOUSING TO REDUCE HIGH CYCLE FATIGUE

(71) Applicant: BorgWarner Inc., Auburn Hills, MI (US)

(72) Inventors: Paul Troxler, Auburn Hills, MI (US); David George Grabowska, Auburn Hills, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/034,721

(22) Filed: Sep. 28, 2020

(65) Prior Publication Data

US 2021/0108555 A1    Apr. 15, 2021

Related U.S. Application Data

(60) Provisional application No. 62/914,752, filed on Oct. 14, 2019.

(51) Int. Cl.
  *F02B 37/00* (2006.01)
  *F04D 29/42* (2006.01)
  (Continued)

(52) U.S. Cl.
  CPC .............. *F02B 37/00* (2013.01); *F01D 25/24* (2013.01); *F02B 39/16* (2013.01); *F04D 29/422* (2013.01);
  (Continued)

(58) Field of Classification Search
  CPC .... F02B 37/00; F02B 39/16; F02B 2039/162; F01D 25/24; F04D 29/422; F05D 2220/40
  See application file for complete search history.

(56) References Cited

U.S. PATENT DOCUMENTS 6,742,989 B2   6/2004   Osako et al.
8,591,177 B2   11/2013  Yokoyama et al.
(Continued)

FOREIGN PATENT DOCUMENTS

CN    204984588 U    1/2016
WO    2018175678 A1  9/2018

OTHER PUBLICATIONS

English language abstract and machine-assisted English translation for CN 204984588 extracted from espacenet.com database on Oct. 19, 2020, 5 pages.

*Primary Examiner* — Audrey B. Walter
(74) *Attorney, Agent, or Firm* — Howard & Howard Attorneys PLLC

(57) ABSTRACT

A turbocharger includes a turbine wheel rotatable about an axis and a turbine housing disposed about the turbine wheel. The turbine housing has an inlet portion defining a turbine housing inlet and has a volute portion defining a turbine housing interior. The volute portion has a first volute wall, a second volute wall spaced from the first volute wall, and a tongue separating the turbine housing inlet and the turbine housing interior. The tongue has a first tongue portion extending from the first volute wall substantially toward the second volute wall along the axis, a second tongue portion extending from the first tongue portion substantially circumferentially about the axis, and a third tongue portion extending from the second tongue portion substantially toward the second volute wall along the axis to reduce high cycle fatigue of the turbine wheel.

19 Claims, 7 Drawing Sheets

(51) Int. Cl.
 *F02B 39/16* (2006.01)
 *F01D 25/24* (2006.01)
(52) U.S. Cl.
 CPC .... *F02B 2039/162* (2013.01); *F05D 2220/40* (2013.01)

(56) References Cited

U.S. PATENT DOCUMENTS

| | | |
|---|---|---|
| 9,828,913 B2* | 11/2017 | Sloss ................ F01D 9/026 |
| 10,132,190 B2 | 11/2018 | Blaylock |
| 2012/0251315 A1* | 10/2012 | Watanabe ........... F01D 9/026 |
| | | 415/212.1 |
| 2013/0108414 A1* | 5/2013 | Maeda ................ F01D 25/24 |
| | | 415/178 |
| 2017/0022830 A1 | 1/2017 | Hughes |
| 2018/0223679 A1 | 8/2018 | Yokoyama et al. |

* cited by examiner

TURBOCHARGER INCLUDING A TURBINE HOUSING TO REDUCE HIGH CYCLE FATIGUE

BACKGROUND OF THE INVENTION

1. Field of the Invention

The present invention relates generally to a turbocharger for delivering compressed air to an internal combustion engine and for receiving exhaust gas from the internal combustion engine.

2. Description of the Related Art

Turbochargers receive exhaust gas from an internal combustion engine and deliver compressed air to the internal combustion engine. Turbochargers are used to increase power output of the internal combustion engine, lower fuel consumption of the internal combustion engine, and reduce emissions produced by the internal combustion engine. Delivery of compressed air to the internal combustion engine by the turbocharger allows the internal combustion engine to be smaller, yet able to develop the same or similar amount of horsepower as larger, naturally aspirated internal combustion engines. Having a smaller internal combustion engine for use in the vehicle reduces the mass and aerodynamic frontal area of the vehicle, which helps reduce fuel consumption of the internal combustion engine and improve fuel economy of the vehicle.

Typical turbochargers include a turbine wheel rotatable about an axis and a turbine housing disposed about the turbine wheel. Typical turbine housings have an inlet portion defining a turbine housing inlet configured to be in communication with the internal combustion engine for receiving exhaust gas from the internal combustion engine. Typical turbine housings also have a volute portion extending from the inlet portion circumferentially about the axis. The volute portion conventionally defines a turbine housing interior in fluid communication with the turbine housing inlet for receiving exhaust gas from the turbine housing inlet, and conventionally defines a turbine housing outlet in fluid communication with the turbine housing interior for discharging exhaust gas from the turbine housing interior.

In many conventional turbochargers, the turbine housing has a tongue separating the turbine housing inlet and the turbine housing interior to direct flow of exhaust gas in the volute portion of the turbine housing to the turbine wheel. Traditional tongues have been designed to optimize aerodynamic performance, but disadvantageously direct flow of exhaust gas toward the turbine wheel such that the turbine wheel may be subject to high cycle fatigue (HCF) which leads to failure of the turbine wheel. More specifically, conventional turbine housings are designed to maximize aerodynamic performance by targeting a preferred flowrate of exhaust gas flowing through the volute portion of the turbine housing and maximizing the thermal efficiency of the turbocharger at the preferred flowrate of exhaust gas flowing through the volute portion of the turbine housing.

During operation of the turbocharger, the exhaust gas flows at the preferred flowrate from the internal combustion engine, through the inlet portion of the turbine housing, and to the volute portion of the turbine housing. The tongue directs the flow of exhaust gas toward the turbine wheel, and the flow of exhaust gas generates a pressure pulse from the tongue to the turbine wheel.

The pressure pulse is characterized by a narrow and sharp peak in the pressure of the exhaust gas near the tongue that excites a natural frequency at which the turbine wheel resonates during operation of the turbocharger. Said differently, the narrow and sharp peak of the pressure pulse may amplify the natural frequency of the turbine wheel and result in the turbine wheel exhibiting resonance. Resonance of the turbine wheel leads to an increased risk of high cycle fatigue of the turbine wheel. High cycle fatigue, in turn, may lead to cracks forming in the turbine wheel which have the potential to cause the turbine wheel to fail. Therefore, the pressure pulse may decrease the durability of the turbine wheel by increasing the likelihood of failure resulting from high cycle fatigue caused by resonance of the turbine wheel.

As such, there remains a need to provide an improved turbine housing for a turbocharger.

SUMMARY OF THE INVENTION AND ADVANTAGES

The present invention provides a turbocharger for delivering compressed air to an internal combustion engine and for receiving exhaust gas from the internal combustion engine. The turbocharger includes a turbine wheel rotatable about an axis and a turbine housing disposed about the turbine wheel. The turbine housing includes an inlet portion and a volute portion. The inlet portion extends between a first end and a second end opposite the first end, and the inlet portion defines a turbine housing inlet configured to be in fluid communication with the internal combustion engine at the first end for receiving exhaust gas from the internal combustion engine. The volute portion extends from the inlet portion at the second end and extends circumferentially about the axis. The volute portion has a first volute wall and a second volute wall spaced from the first volute wall along the axis.

The volute portion of the turbine housing defines a turbine housing interior and a turbine housing outlet. The turbine housing interior is in fluid communication with the turbine housing inlet for receiving exhaust gas from the turbine housing inlet, and the turbine housing outlet is in fluid communication with the turbine housing interior for discharging exhaust gas from the turbine housing interior. The turbine housing has a tongue separating the turbine housing inlet and the turbine housing interior.

The tongue has a first tongue portion, a second tongue portion, and a third tongue portion. The first tongue portion extends from the first volute wall substantially toward the second volute wall along the axis, the second tongue portion extends from the first tongue portion substantially circumferentially about the axis, and the third tongue portion extends from the second tongue portion substantially toward the second volute wall along the axis to reduce high cycle fatigue of the turbine wheel.

Most conventional turbochargers are designed to maximize aerodynamic performance by targeting a preferred flowrate of exhaust gas flowing through the volute portion of the turbine housing and maximizing the thermal efficiency of the turbocharger at the preferred flowrate. However, the turbocharger of the present invention maximizes resilience of the turbine wheel to high cycle fatigue, thus maximizing durability of the turbine wheel itself.

The first, second, and third tongue portions generate a disturbance in the flow of exhaust gas from the internal combustion engine, in the volute portion of the turbine housing, and to the turbine wheel. This disturbance in the flow of exhaust gas alters characteristics of a pressure pulse of the exhaust gas from the tongue to the turbine wheel.

The first, second, and third tongue portions are designed in a manner that the disturbance generated alters the characteristics of the pressure pulse by shaping the pressure pulse to remove spectral content equivalent to a natural frequency at which the turbine wheel resonates during operation of the turbocharger. The turbine wheel, therefore, is less likely to exhibit resonance caused by flow of exhaust gas from the tongue, and the turbine wheel is also less likely to be subject to high cycle fatigue which may lead to cracks forming in the turbine wheel and which have the potential to cause the turbine wheel to fail. In turn, the turbine wheel has increased durability by being less likely to be subject to high cycle fatigue caused by resonance.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
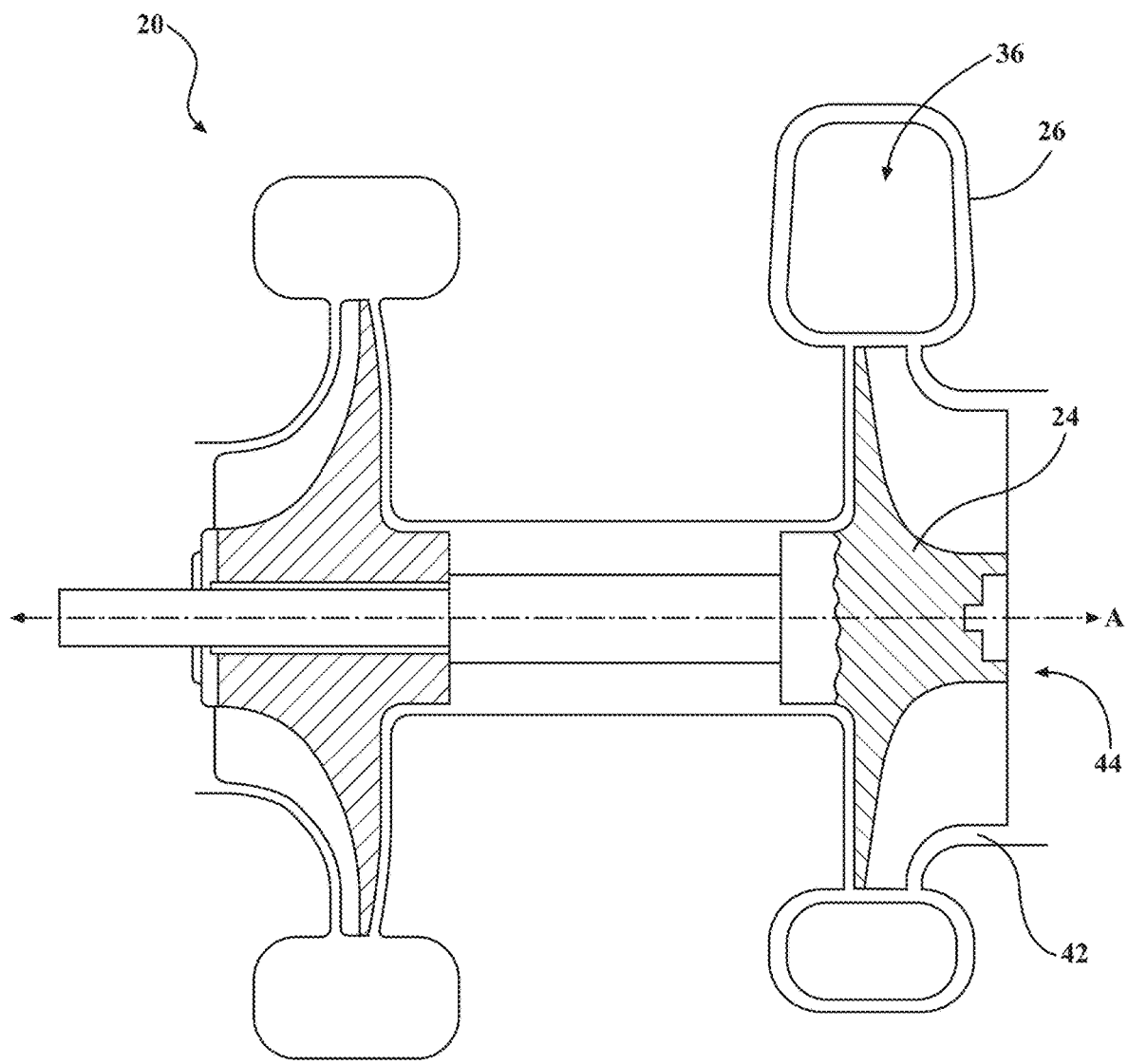
FIG. 1 is a schematic illustration of a turbocharger along an axis.
Figure 2:
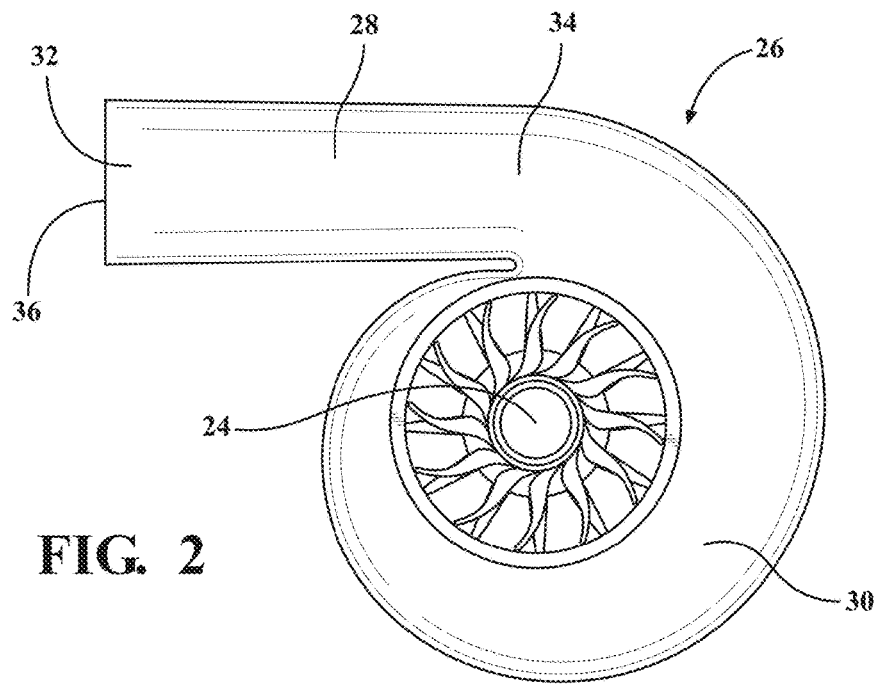
FIG. 2 is a perspective view of the turbocharger in FIG. 1 along the axis.
Figure 3:
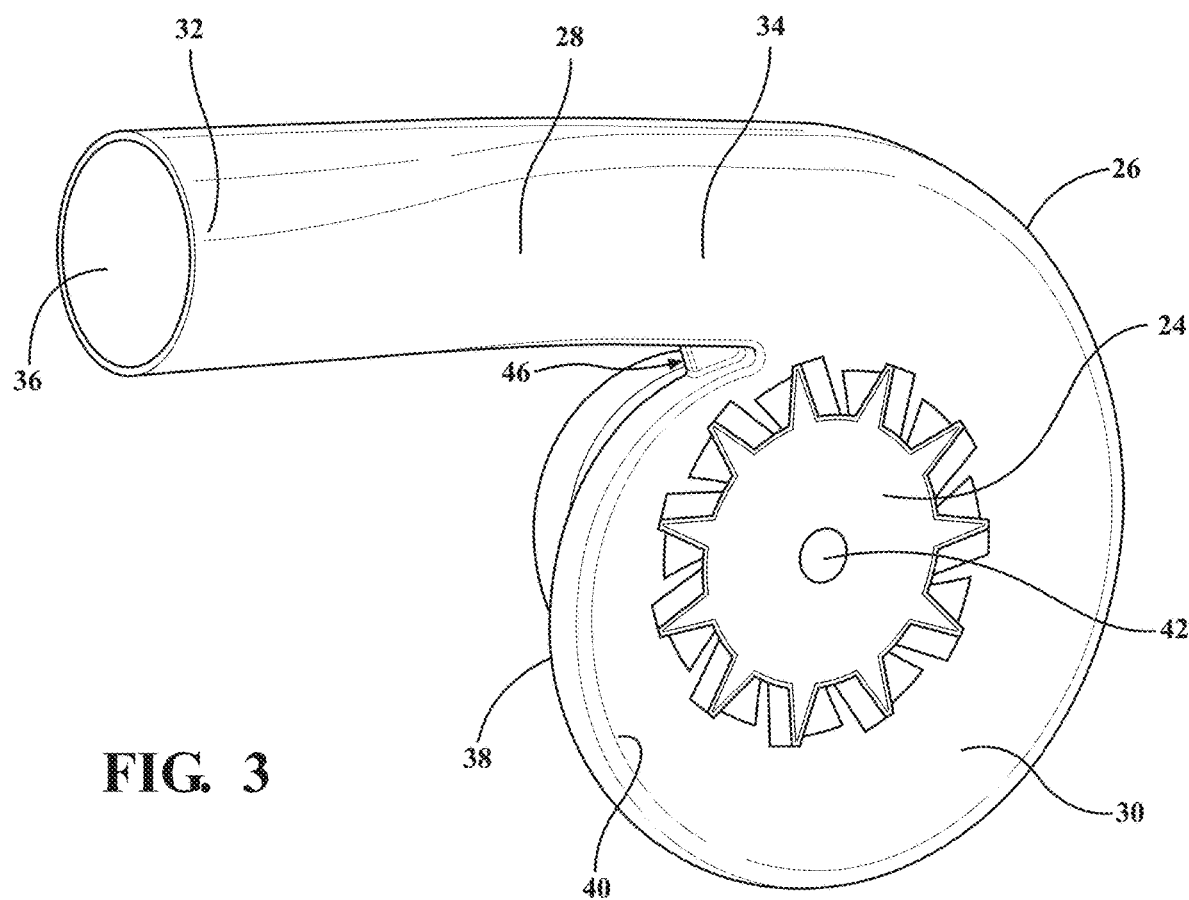
FIG. 3 is a perspective view of the turbocharger illustrating a turbine wheel and a tongue.
Figure 4:
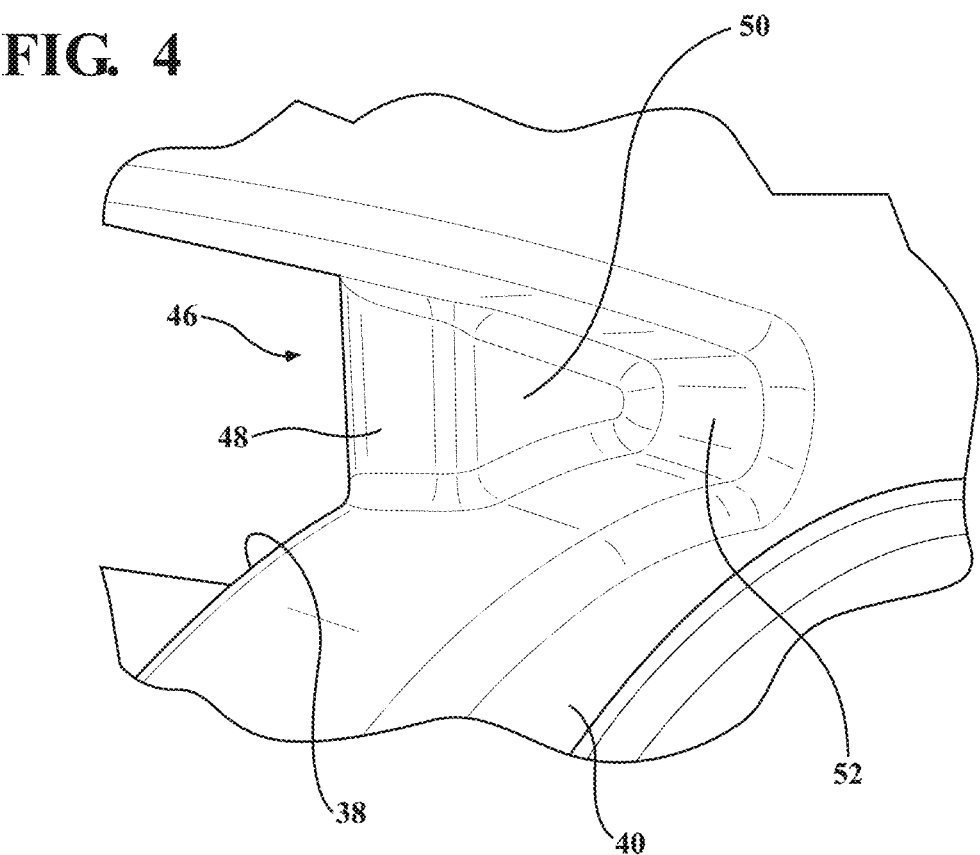
FIG. 4 is an enlarged view of the turbocharger illustrated in FIG. 3.

With reference to the Figures, wherein like numerals indicate like parts throughout the several views, a turbocharger 20 is shown schematically in FIG. 1. The turbocharger 20 delivers compressed air to an internal combustion engine and receives exhaust gas from the internal combustion engine. The turbocharger 20 includes a turbine wheel 24 rotatable about an axis A and a turbine housing 26 disposed about the turbine wheel 24. As shown in FIGS. 2 and 3, the turbine housing 26 includes an inlet portion 28 and a volute portion 30. The inlet portion 28 extends between a first end 32 and a second end 34 opposite the first end 32, and the inlet portion 28 defines a turbine housing inlet 36 configured to be in fluid communication with the internal combustion engine at the first end 32 for receiving exhaust gas from the internal combustion engine. The volute portion 30 extends from the inlet portion 28 at the second end 34 and extends circumferentially about the axis A. The volute portion 30 has a first volute wall 38 and a second volute wall 40 spaced from the first volute wall 38 along the axis A.

The volute portion 30 of the turbine housing 26 defines a turbine housing interior 42 and a turbine housing outlet 44. The turbine housing interior 42 is in fluid communication with the turbine housing inlet 36 for receiving exhaust gas from the turbine housing inlet 36, and the turbine housing outlet 44 is in fluid communication with the turbine housing interior 42 for discharging exhaust gas from the turbine housing interior 42. As shown in FIG. 3, the turbine housing 26 has a tongue 46 separating the turbine housing inlet 36 and the turbine housing interior 42.

The tongue 46 has a first tongue portion 48, a second tongue portion 50, and a third tongue portion 52. The first tongue portion 48 extends from the first volute wall 38 substantially toward the second volute wall 40 along the axis A, the second tongue portion 50 extends from the first tongue portion 48 substantially circumferentially about the axis A, and the third tongue portion 52 extends from the second tongue portion 50 substantially toward the second volute wall 40 along the axis A. Although not required, the first tongue portion 48 may extend directly from the first volute wall 38, the second tongue portion 50 may extend directly from the first tongue portion 48, and the third tongue portion 52 may extend directly from the second tongue portion 50. Together, the first tongue portion 48, the second tongue portion 50, and the third tongue portion 52 reduce high cycle fatigue of the turbine wheel 24.

While most conventional turbine housings are designed to maximize aerodynamic performance by targeting a preferred flowrate of exhaust gas flowing through the volute portion 30 of the turbine housing 26 and maximizing the thermal efficiency of the turbocharger 20 at the preferred flowrate, the turbine housing 26 of the present invention is designed to maximize resilience of the turbine wheel 24 to high cycle fatigue, thus maximizing durability of the turbine wheel 24 itself.

The first, second, and third tongue portions 48, 50, 52 generate a disturbance in the flow of exhaust gas from the internal combustion engine, in the volute portion 30 of the turbine housing 26, and to the turbine wheel 24. This disturbance in the flow of exhaust gas alters characteristics of a pressure pulse of the exhaust gas from the tongue 46 to the turbine wheel 24.

The first, second, and third tongue portions 48, 50, 52 are designed in a manner that the disturbance generated alters the characteristics of the pressure pulse by shaping the pressure pulse to remove spectral content equivalent to a natural frequency at which the turbine wheel resonates during operation of the turbocharger. More specifically, the first, second, and third tongue portions 48, 50, 52 may be designed to broaden the width and lower the amplitude of the pressure pulse such that the pressure pulse is less likely to excite the natural frequency at which the turbine wheel 24 resonates during operation of the turbocharger 10. The turbine wheel 24, therefore, is less likely to exhibit resonance caused by flow of exhaust gas from the tongue 46, and the turbine wheel 24 is also less likely to be subject to high cycle fatigue which may lead to cracks forming in the turbine wheel 24 and which have the potential to cause the turbine wheel 24 to fail. In turn, the turbine wheel 24 has increased durability by being less likely to be subject to high cycle fatigue caused by resonance.

In one embodiment, the first, second, and third tongue portions 48, 50, 52 together define a radial cross-section 54 between the first and second volute walls 38, 40. The radial cross-section 54 of the first, second, and third tongue portions 48, 50, 52 remains constant circumferentially along a length L of the tongue 46.

Alternatively, the first, second, and third tongue portions 48, 50, 52 together may define the radial cross-section 54 between the first and second volute walls 38, 40 that varies circumferentially along the length L of the tongue 46. In a non-limiting example, the radial cross-section 54 of the first, second, and third tongue portions 48, 50, 52 decreases as the first, second, and third tongue portions 48, 50, 52 extend circumferentially along the length L of the tongue 46 toward the second end 34 of the inlet portion 28. In another non-limiting example, the radial cross-section 54 of the first, second, and third tongue portions 48, 50, 52 increases as the first, second, and third tongue portions 48, 50, 52 extend circumferentially along the length L of the tongue 46 toward the second end 34 of the inlet portion 28.

Moreover, in one embodiment, the radial cross-section 54 of the first, second, and third tongue portions 48, 50, 52 remains constant radially away from the axis A. In another embodiment, the radial cross-section of the first, second, and third tongue portions 48, 50, 52 varies as the first, second, and third tongue portions 48, 50, 52 extend radially away from the axis A. In a non-limiting example, the radial cross-section of the first, second, and third tongue portions 48, 50, 52 increases as the first, second, and third tongue portions 48, 50, 52 extend radially away from the axis A. In another non-limiting example, the radial cross-section of the first, second, and third tongue portions 48, 50, 52 decreases as the first, second, and third tongue portions 48, 50, 52 extend radially away from the axis A.

Figure 5A:
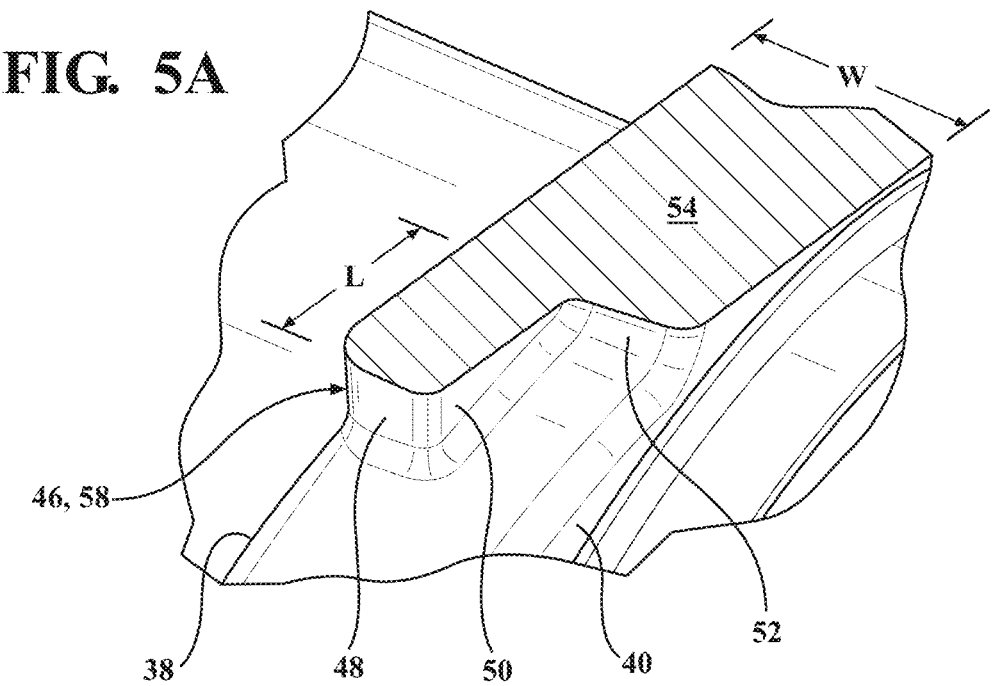
FIG. 5A is a partial cross-sectional view of the turbocharger illustrated in FIG. 4, with the tongue having first, second, and third tongue portions.
Figure 5B:
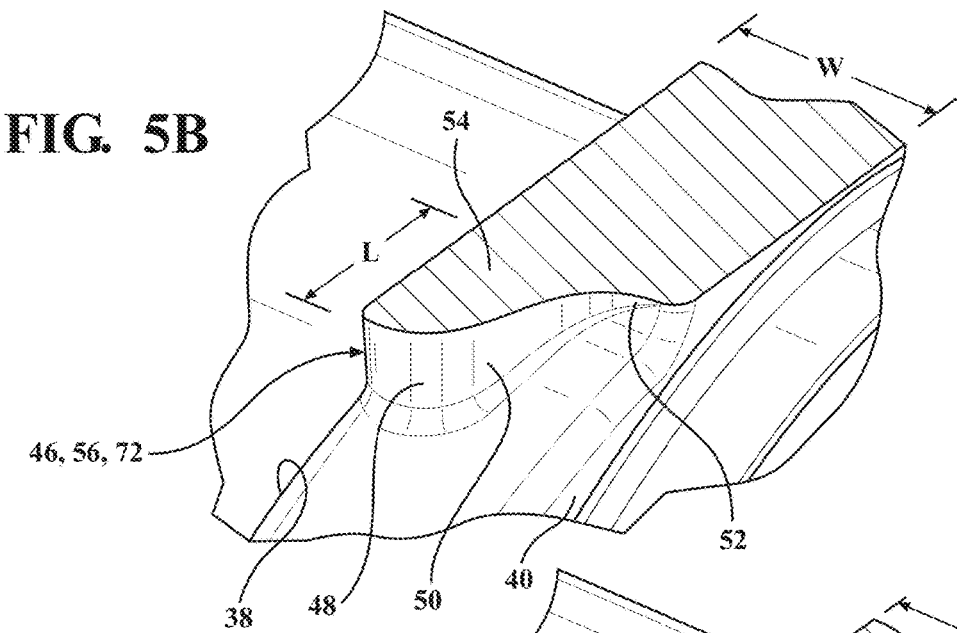
FIG. 5B is a partial cross-sectional view of the turbocharger illustrated in FIG. 4, with the first, second, and third tongue portions together establishing an undulating configuration to form an undulating tongue.
Figure 5C:
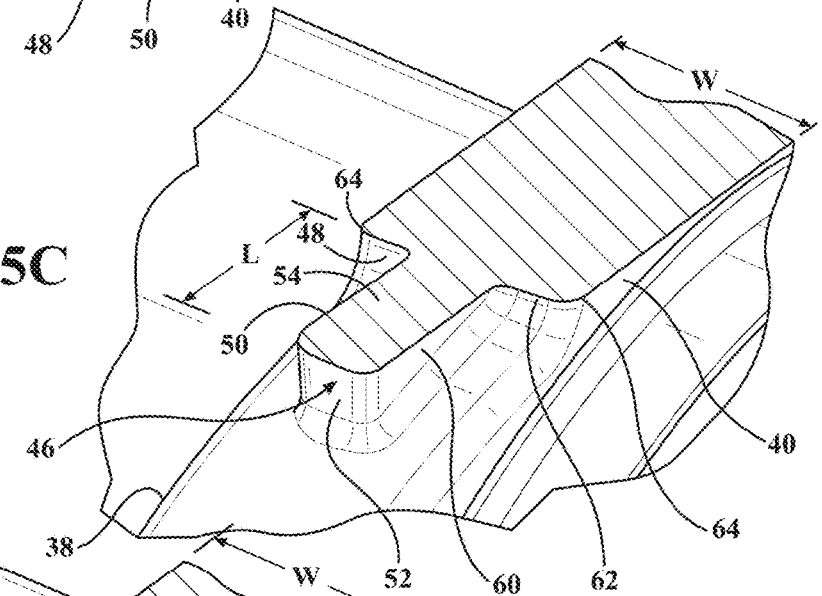
FIG. 5C is a partial cross-sectional view of the turbocharger illustrated in FIG. 4, with the tongue further having a fourth tongue portion extending from the third tongue portion substantially circumferentially about the axis, and having a fifth tongue portion extending from the fourth tongue portion substantially toward the second volute wall along the axis.
Figure 5D:
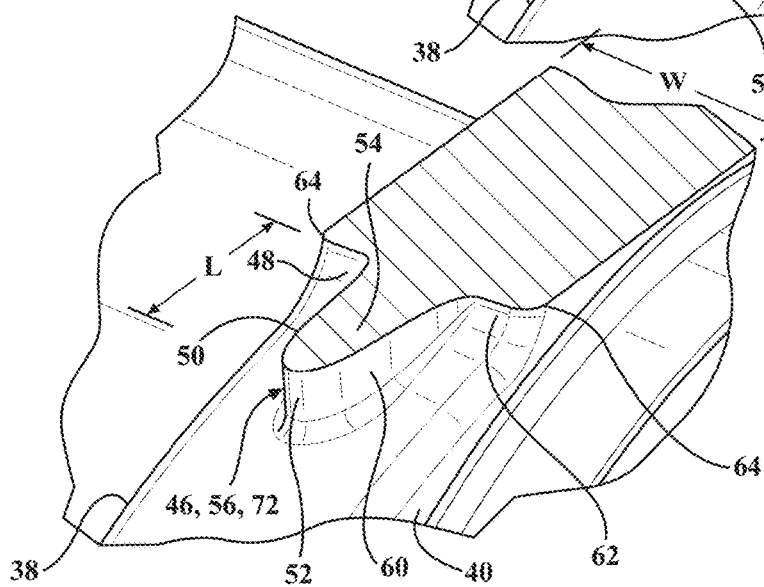
FIG. 5D is a partial cross-sectional view of the turbocharger illustrated in FIG. 4, with the fourth and fifth tongue portions together establishing an undulating configuration to form the undulating tongue.
Figure 5E:
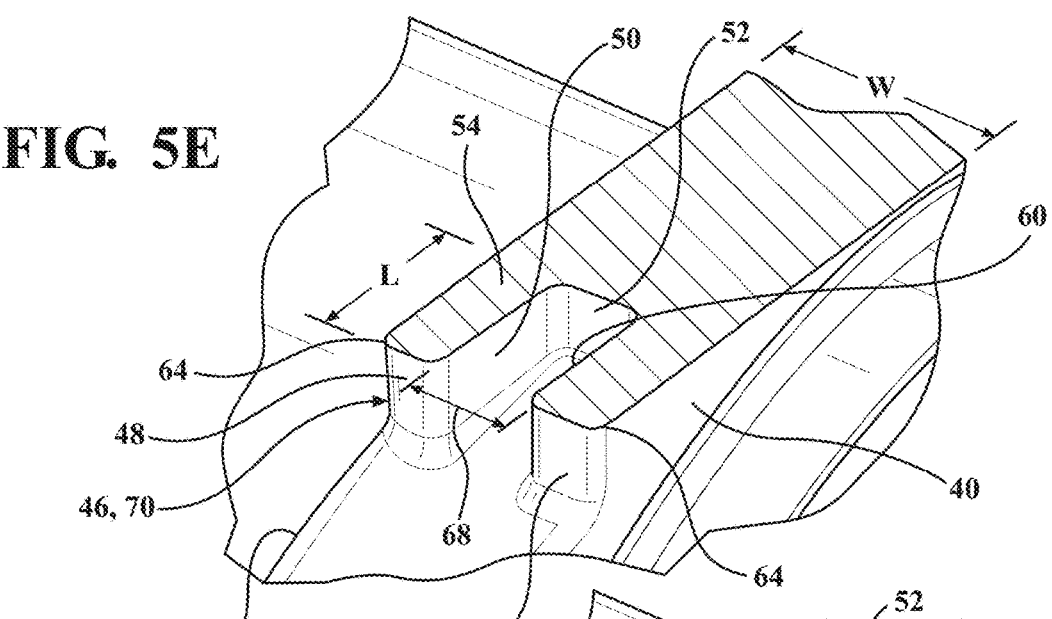
FIG. 5E is a partial cross-sectional view of the turbocharger illustrated in FIG. 4, with the first, second, third, fourth, and fifth tongue portions defining a groove to form a grooved tongue.
Figure 5F:
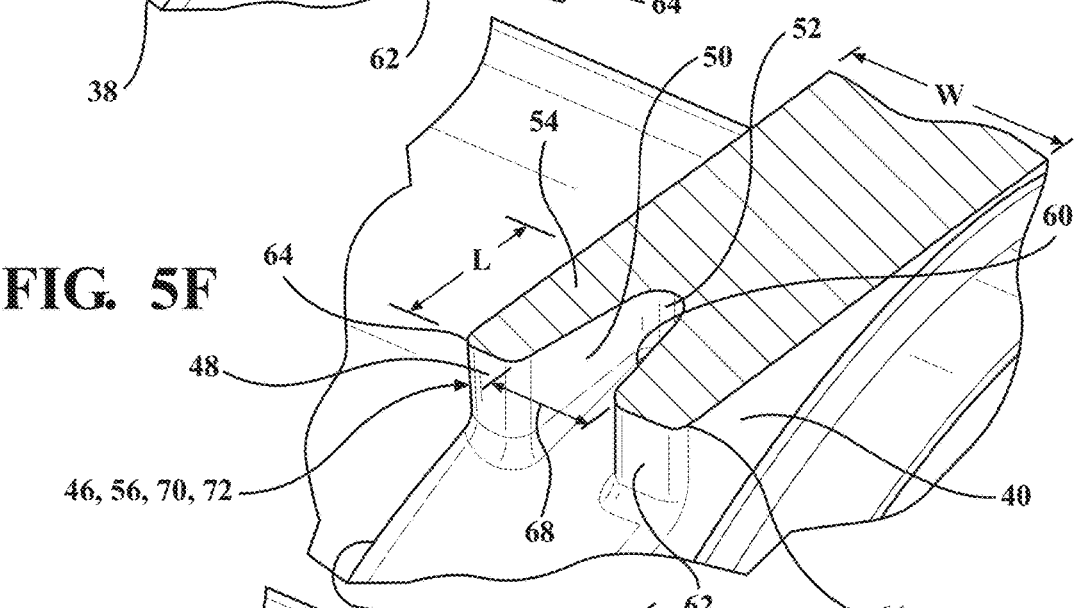
FIG. 5F is a partial cross-sectional view of the turbocharger illustrated in FIG. 4, with the first, second, third, fourth, and fifth tongue portions of the grooved tongue together establishing an undulating configuration.
Figure 5G:
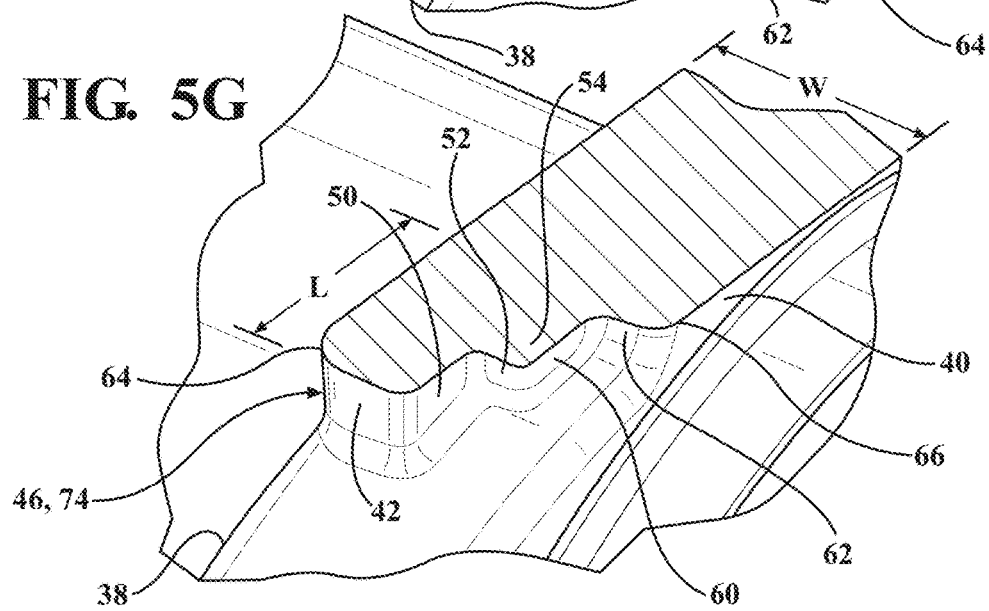
FIG. 5G is a partial cross-sectional view of the turbocharger illustrated in FIG. 4, with the first, second, third, fourth, and fifth tongue portions stepped with two distinct steps to form a double stepped tongue.
Figure 5H:
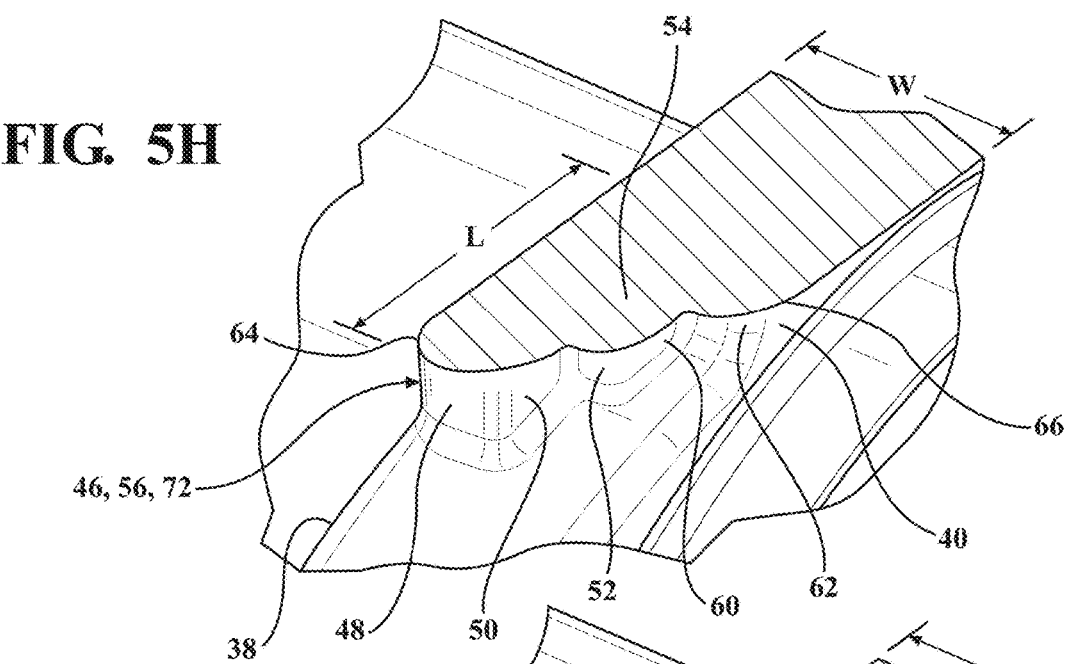
FIG. 5H is a partial cross-sectional view of the turbocharger illustrated in FIG. 4, with the first, second, third, fourth, and fifth tongue portions having the undulating configuration approximating the double stepped tongue.

In another embodiment, the first and second volute walls 38, 40 have a volute width W defined therebetween, and the first tongue portion 48 extends from the first volute wall 38 10 to 90% of the volute width W toward the second volute wall 40. It is to be appreciated that this range is merely exemplary. The first tongue portion 48 may extend from the first volute wall 38 more than 90% of the volute width W toward the second volute wall 40, or the first tongue portion 48 may extend from the first volute wall less than 10% of the volute width W toward the second volute wall 40. Exemplary first tongue portions 48 having values falling within the range of the volute width W that the first tongue portion 48 may extend from the first volute wall 38 toward the second volute wall 40 are shown in FIGS. 5A, 5I, and 5J.

Figure 5I:
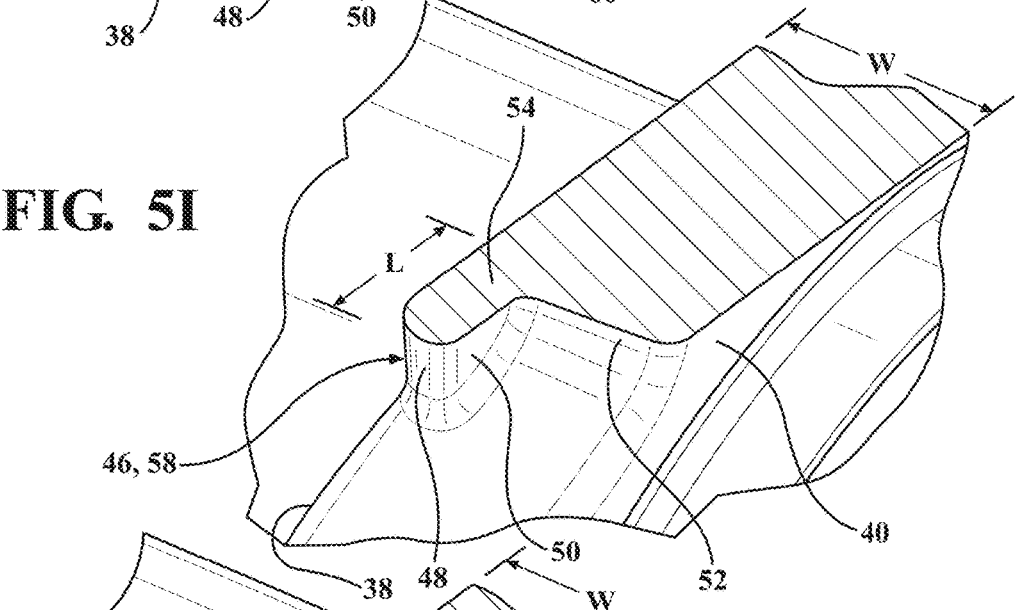
FIG. 5I is a partial cross-sectional view of the turbocharger illustrated in FIG. 4, with the turbocharger having first and second volute walls having a volute width defined therebetween, and with the first tongue portion extending from the first volute wall 10% to 50% of the volute width toward the second volute wall.
Figure 5J:
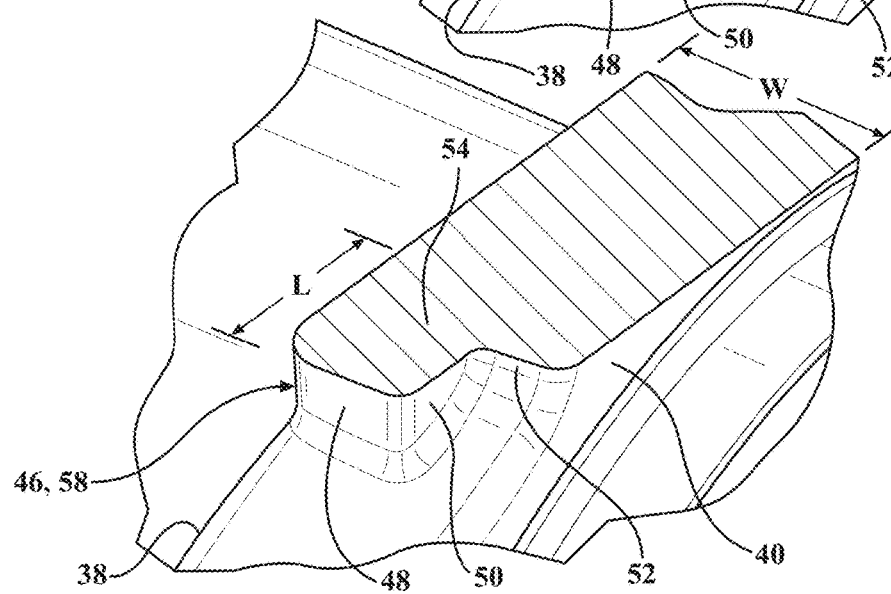
FIG. 5J is a partial cross-sectional view of the turbocharger illustrated in FIG. 4, with the third tongue portion extending from the second tongue portion 50% to 90% of the volute width toward the second volute wall, and with the third tongue portion extending completely to the second volute wall.

In one embodiment, as shown in FIG. 5I, the first tongue portion 48 extends from the first volute wall 38 10% to 50% of the volute width W toward the second volute wall 40. As non-limiting examples pertaining to this embodiment, the first tongue portion 48 may extend from the first volute wall 38 10% to 40% of the volute width W toward the second volute wall 40, the first tongue portion 48 may extend 20% to 40% of the volute width W toward the second volute wall 40, or the first tongue portion 48 may extend 20% to 30% of the volute width W toward the second volute wall 40. In another embodiment, as shown in FIG. 5A, the first tongue portion 48 extends from the first volute wall 38 approximately 50% of the volute width W toward the second volute wall 40. As a non-limiting example pertaining to this embodiment, the first tongue portion 48 may extend from the first volute wall 38 45% to 55% of the volute width W toward the second volute wall 40. In yet another embodiment, as shown in FIG. 5J, the first tongue portion 48 extends from the first volute wall 38 50% to 90% of the volute width W toward the second volute wall 40. As non-limiting examples pertaining to this embodiment, the first tongue portion 48 may extend from the first volute wall 38 60% to 90% of the volute width W toward the second volute wall 40, the first tongue portion 48 may extend from the first volute wall 38 60% to 80% of the volute width W toward the second volute wall 40, or the first tongue portion 48 may extend from the first volute wall 38 70% to 80% of the volute width W toward the second volute wall 40.

In yet another embodiment, the second tongue portion 50 extends 10 to 40 degrees about the axis A. It is to be appreciated that this range is merely exemplary. The second tongue portion 50 may extend from the first tongue portion 48 to the third tongue portion 52 more than 40 degrees about the axis A, or the second tongue portion 50 may extend from the first tongue portion 48 to the third tongue portion 52 less than 10 degrees about the axis A. As non-limiting examples pertaining to this embodiment, the second tongue portion 50 may extend 15 to 35 degrees about the axis A, or the second tongue portion 50 may extend 20 to 30 degrees about the axis A. Exemplary second tongue portions 50 having values falling within the range of the degrees that the second tongue portion 50 may extend about the axis are shown in FIGS. 5A, 5K, and 5L.

Figure 5K:
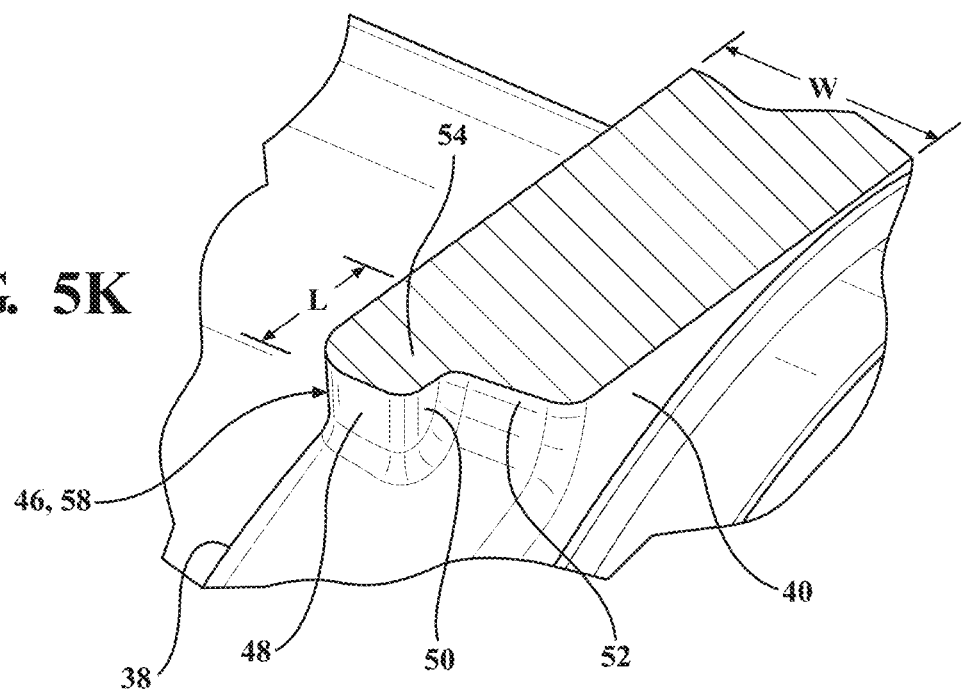
FIG. 5K is a partial cross-sectional view of the turbocharger illustrated in FIG. 4, with the second tongue portion extending 10 degrees about the axis.
Figure 5L:
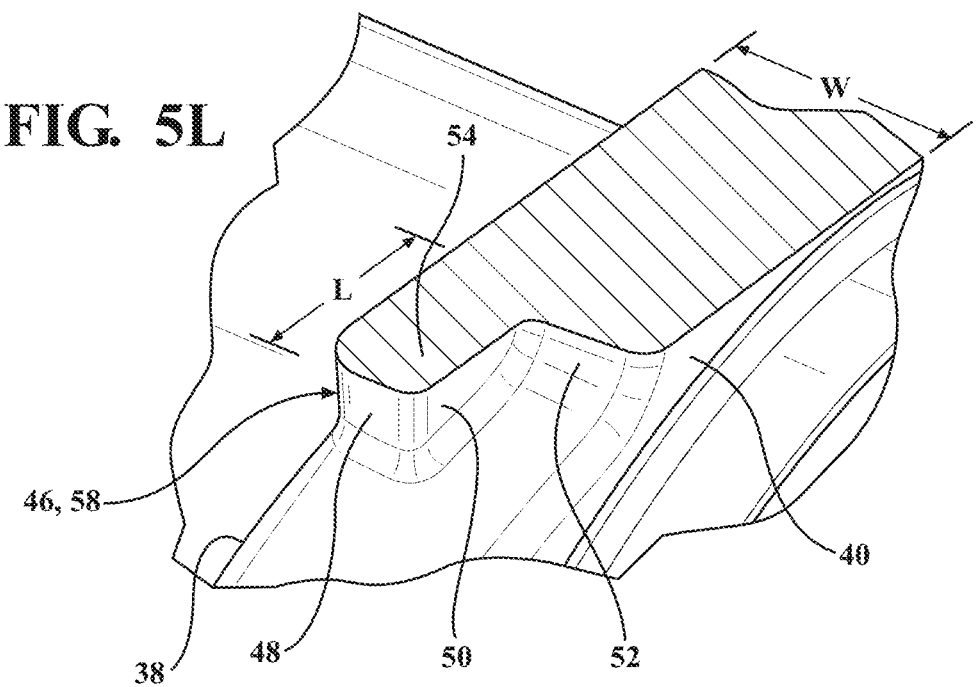
FIG. 5L is a partial cross-sectional view of the turbocharger illustrated in FIG. 4, with the second tongue portion extending 40 degrees about the axis.

In one embodiment, as shown in FIG. 5K, the second tongue portion 50 extends 10 degrees about the axis A. In another embodiment, as shown in FIG. 5L, the second tongue portion 50 extends 40 degrees about the axis A. In yet another embodiment, as shown in FIG. 5A, the second tongue portion 50 extends more than 40 degrees about the axis A.

Moreover, in another embodiment, the third tongue portion 52 extends from the second tongue portion 50 10% to 90% of the volute width W toward the second volute wall 40. It is to be appreciated that this range is merely exemplary. The third tongue portion 52 may extend from the second tongue portion 50 toward the second volute wall 40 more than 90% of the volute width W, or the third tongue portion 52 may extend from the second tongue portion 50 toward the second volute wall 40 less than 10% of the volute width W. Exemplary third tongue portions 52 having values falling within the range of the volute width W that the third tongue portion 52 may extend from the second tongue portion 50 toward the second volute wall 40 are shown in FIGS. 5A, 5I, and 5J.

In one embodiment, as shown in FIG. 5I, the third tongue portion 52 extends from the second tongue portion 50 50% to 90% of the volute width W toward the second volute wall 40. As non-limiting examples pertaining to this embodiment, the third tongue portion 52 may extend from the second tongue portion 50 60% to 90% of the volute width W toward the second volute wall 40, the third tongue portion 52 may extend from the second tongue portion 50 60% to 80% of the volute width W toward the second volute wall 40, or the third tongue portion 52 may extend from the second tongue portion 50 70% to 80% of the volute width W toward the second volute wall 40. In another embodiment, as shown in FIG. 5A, the third tongue portion 52 extends from the second tongue portion 50 approximately 50% of the volute width W toward the second volute wall 40. As a non-limiting example pertaining to this embodiment, the third tongue portion 52 may extend from the second tongue portion 45% to 55% of the volute width W toward the second volute wall 40. In yet another embodiment, as shown in FIG. 5J, the third tongue portion 52 extends from the second tongue portion 50 10% to 50% of the volute width W toward the second volute wall 40. As non-limiting examples pertaining to this embodiment, the third tongue portion 52 may extend from the second tongue portion 50 10% to 40% of the volute width W toward the second volute wall 40, the third tongue portion 52 may extend from the second tongue portion 50 20% to 40% of the volute width W toward the second volute wall 40, or the third tongue portion 52 may extend from the second tongue portion 50 20% to 30% of the volute width W toward the second volute wall 40.

In some embodiments, the third tongue portion 52 extends completely to the second volute wall 40, as shown in FIGS. 5A, 5B, and 5I-5L. Said differently, in some embodiments, the third tongue portion 52 contacts the second volute wall 40. In the embodiments where the third tongue portion 52 extends completely to the second volute wall 40, the tongue 46 only has the first, second, and third tongue portions 48, 50, 52 between the first and second volute walls 38, 40.

In certain embodiments, as shown in FIGS. 5B, 5D, 5F, and 5H, the first, second, and third tongue portions 48, 50, 52 together establish an undulating configuration 56. The undulating configuration 56 may be sinusoidal, may be tangential, may be wavy, and/or may have peaks or crests. The undulating configuration 56 also may form smooth, continuous transitions between the first, second, and third tongue portions 48, 50, 52.

In some embodiments, the first tongue portion 48 extends from the first volute wall 38 normally to the first volute wall 38, the second tongue portion 50 extends from the first tongue portion 48 normally to the first tongue portion 48, and the third tongue portion 52 extends from the second tongue portion 50 normally to the second tongue portion 50.

In the embodiments where the third tongue portion 52 extends completely to the second volute wall 40, the first tongue portion 48 extends from the first volute wall 38 normally to the first volute wall 38, and the second tongue portion 50 extends from the first tongue portion 48 normally to the first tongue portion 48, the third tongue portion 52 may extend to the second volute wall 40 such that the third tongue portion 52 is normal to the second volute wall 40. In this embodiment, the first, second, and third tongue portions 48, 50, 52 all extend at approximately 90 degree angles relative to one another and/or relative to the first and second volute walls 38, 40. In this embodiment, the first, second, and third tongue portions 48, 50, 52 are stepped such that they form a stepped tongue 58, as shown in FIGS. 5A and 5I-5L.

The stepped tongue 58 is a simple, yet effective, geometry to manufacture during manufacture of the turbocharger 20. The stepped tongue 58 may result in about a 14.5% reduction in stress on the turbine wheel 24 as compared to a conventional tongue. Advantageously, the stepped tongue 58 also does not meaningfully decrease the aerodynamic performance of the turbocharger 20 and the thermal efficiency of the turbocharger does not decrease by any significant amount. The stepped tongue 58, therefore, reduces high cycle fatigue on the turbine wheel 24 and lessens the likelihood of the turbine wheel 24 failing without significantly affecting the aerodynamic performance or thermal efficiency of the turbocharger 20.

In other embodiments, the third tongue portion 52 does not extend completely to the second volute wall 40. In other words, in other embodiments, the third tongue portion 52 does not contact the second volute wall 40. In these embodiments, the tongue 46 further has a fourth tongue portion 60 extending from the third tongue portion 52 substantially circumferentially about the axis A, and the tongue 46 further has a fifth tongue portion 62 extending from the fourth tongue portion 60 substantially toward the second volute wall 40 along the axis A. Although not required, the fourth tongue portion 60 may extend directly from the third tongue portion 52, and the fifth tongue portion 62 may extend directly from the fourth tongue portion 60. Embodiments including the fourth and fifth tongue portions 60, 62 are depicted in FIGS. 5C-5H.

In the embodiments where the tongue 46 has the fourth and fifth tongue portions 60, 62, the first tongue portion 48 may extend from the first volute wall 38 at a first circumferential position 64, and the fifth tongue portion 62 may extend toward the second volute wall 40 at a second circumferential position 66 different from the first circumferential position 64. Said differently, in these embodiments, the second and fourth tongue portions 50, 60 do not extend the same degrees about the axis A such that the first and fifth tongue portions 48, 62 extend from the first volute wall 38 and toward the second volute wall 40, respectively, at different positions circumferentially spaced about the axis A.

The first circumferential position 64 at which the first tongue portion 48 extends from the first volute wall 38 may be closer to the second end 34 of the inlet portion 28 and the second circumferential position 66 at which the fifth tongue portion 62 extends toward the second volute wall 40 may be further from the second end 34 of the inlet portion 28. Alternatively, the first circumferential position 64 at which the first tongue portion 48 extends from the first volute wall 38 may be further from the second end 34 of the inlet portion 28 and the second circumferential position 66 at which the fifth tongue portion 62 extends toward the second volute wall 40 may be closer to the second end 34 of the inlet portion 28.

In alternative embodiments, the first tongue portion 48 extends from the first volute wall 38 at a first circumferential position 64 and the fifth tongue portion 62 extends toward the second volute wall 40 at the first circumferential position 64, as shown in FIGS. 5C-5F. In other words, in these embodiments, the second and fourth tongue portions 50, 60 extend the same degrees about the axis A such that the first and fifth tongue portions 48, 62 extend from the first volute wall 38 and toward the second volute wall 40, respectively, at the same position circumferentially about the axis A.

Additionally, in the embodiments where the tongue 46 has the fourth and fifth tongue portions 60, 62, the fifth tongue portion 62 may extend completely to the second volute wall 40. Said differently, in some embodiments, the fifth tongue portion 62 contacts the second volute wall 40. In the embodiments where the fifth tongue portion 62 extends completely to the second volute wall 40, the tongue 46 only has the first, second, third, fourth, and fifth tongue portions 48, 50, 52, 60, 62 between the first and second volute walls 38, 40.

In some embodiments, the second and fourth tongue portions 50, 60 extend circumferentially substantially in the same direction. In other words, the second tongue portion 50 extends from the first tongue portion 48 in a first direction circumferentially about the axis A, and the fourth tongue portion 60 extends from the third tongue portion 52 also in the first direction circumferentially about the axis A, as shown in FIGS. 5G and 5H. The second and fourth tongue portions 50, 60 may extend the same degrees about the axis A, or may extend different degrees about the axis A.

In other embodiments where the tongue 46 has the fourth and fifth tongue portions 60, 62 and the fifth tongue portion 62 extends completely to the second volute wall 40, the first, second, third, fourth, and firth tongue portions 48, 50, 52, 60, 62 define a groove 68 such that they form a grooved tongue 70, as shown in FIGS. 5E and 5F. In the embodiments where the tongue 46 is the grooved tongue 70, the second and fourth tongue portions 50, 60 extend circumferentially substantially in different directions. In other words, the second tongue portion 50 extends from the first tongue portion 48 in the first direction circumferentially about the axis A, and the fourth tongue portion 60 extends from the third tongue portion 52 in a second direction opposite the first direction and circumferentially about the axis A. The second and fourth tongue portions 50, 60 may extend the same degrees about the axis A, or may extend different degrees about the axis A.

In certain embodiments, the fourth and fifth tongue portions together establish the undulating configuration 56, as shown in FIGS. 5F and 5H. The undulating configuration 56 may be sinusoidal, may be tangential, may be wavy, and/or may have peaks or crests. The undulating configuration 56 also may form smooth, continuous transitions between the fourth and fifth tongue portions 60, 62. In the embodiments where the first, second, third, fourth, and fifth tongue portions 48, 50, 52, 60, 62 together establish the undulating configuration 56, the tongue 46 has smooth, continuous transitions between the third and fourth tongue portions 52, 60 such that they form an undulating tongue 72.

Alternatively, the fourth tongue portion 60 may extend from the third tongue portion 52 normally to the third tongue portion 52, and the fifth tongue portion 62 may extend from the fourth tongue portion 60 normally to the fourth tongue portion 60. The fifth tongue portion 62 may extend to the second volute wall 40 such that the fifth tongue portion 62 is normal to the second volute wall 40.

In the embodiments where the fifth tongue portion 62 extends completely to the second volute wall 40, the fourth tongue portion 60 extends from the third tongue portion 52 normally to the third tongue portion 52, and the fifth tongue portion 62 extends from the fourth tongue portion 60 normally to the fourth tongue portion 60, the fifth tongue portion 62 may also extend to the second volute wall 40 such that the fifth tongue portion 62 is normal to the second volute wall 40. In this embodiment, the fourth and fifth tongue portions 60, 62 extend at approximately 90 degree angles relative to one another and/or relative to the second volute wall 40. Additionally, in the embodiments where the first, second, third, fourth, and fifth tongue portions 48, 50, 52, 60, 62 extend normally to one another, the first, second, third, fourth, and fifth tongue portions 48, 50, 52, 60, 62 are stepped with two distinct steps such that they form a double stepped tongue 74, as shown in FIG. 5G.

It is to be appreciated that multiple steps may be formed by the tongue 46. The number of steps formed by the tongue 46 depends on the number of tongue portions extending normally to one another, among other factors.

The grooved tongue 70, the undulating tongue 72, and the double stepped tongue 74 are slightly more complex geometries as compared to the stepped tongue 58 while still remaining relatively simple and effective geometries to manufacture during manufacture of the turbocharger 20. The grooved tongue 70, the undulating tongue 72, and the double stepped tongue 74 further reduce high cycle fatigue on the turbine wheel 24 and lessen the likelihood of the turbine wheel 24 failing without significantly affecting the aerodynamic performance or thermal efficiency of the turbocharger 20.

It is to be appreciated that the turbocharger 20 may have more than one tongue 46. For instance, the turbocharger 20 may be a dual-volute turbocharger or a twin-scroll turbocharger, both of which may have more than one tongue 46. In these embodiments, only one of the tongues 46 may have the first, second, and third tongue portions 48, 50, 52 and may also optionally have the fourth and fifth tongue portions 60, 62. Alternatively, both or all of the tongues 46 may have the first, second, and third tongue portions 48, 50, 52 and may also optionally have the fourth and fifth tongue portions 60, 62.

The turbine housing 26 of the turbocharger 20 can be manufactured through a variety of techniques. In a preferred embodiment, the turbine housing 26 is cast. The turbine housing 26 being cast results in the first, second, and third tongue portions 48, 50, 52 being integral with one another. In the embodiments with the fourth and fifth tongue portions 60, 62, the fourth and fifth tongue portions 60, 62 are also integral with the first, second, and third tongue portions 48, 50, 52. The turbine housing 26 being cast allows more intricate and detailed design of the first, second, third, fourth, and fifth tongue portions 48, 50, 52, 60, 62. The turbine housing 26 of the turbocharger 20 being cast also results in quicker and cheaper manufacturing of the turbine housing 26. It is to be appreciated, however, that the turbine housing 26 may also be cast or otherwise formed and then machined to form the first, second, third, fourth, and fifth tongue portions 48, 50, 52, 60, 62.

The first, second, and third tongue portions 48, 50, 52, optionally along with the fourth and fifth tongue portions 60, 62, reduce the likelihood of the turbine wheel 24 being subject to high cycle fatigue caused by resonance. However, the first, second, and third tongue portions 48, 50, 52, optionally along with the fourth and fifth tongue portions 60, 62, may have a marginal negative effect on the aerodynamic performance and/or thermal efficiency of the turbocharger 20 at the preferred flowrate of exhaust gas flowing through the volute portion 30 of the turbine housing 26.

To combat this marginal negative effect, a gap 76 defined between the tongue 46 and the turbine wheel 24 may be lessened to recuperate any decrease in the aerodynamic performance and/or thermal efficiency of the turbocharger 20. However, although lessening the gap 76 may sharpen the pressure pulse and increase the amplitude of the pressure pulse such that the turbine wheel 24 is more likely to be subject to high cycle fatigue, the gap 76 may be lessened without increasing the likelihood of the turbine wheel 24 being subject to high cycle fatigue beyond acceptable limits. The first, second, and third tongue portions 48, 50, 52, optionally with the fourth and fifth tongue portions 60, 62, can thus be used in combination with lessening the gap 76 to reduce the likelihood of the turbine wheel 24 being subject to high cycle fatigue while also increasing the aerodynamic performance and/or the thermal efficiency of the turbocharger 20.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A turbocharger for delivering compressed air to an internal combustion engine and for receiving exhaust gas from the internal combustion engine, said turbocharger comprising:
    a turbine wheel rotatable about an axis;
    a turbine housing disposed about said turbine wheel, said turbine housing comprising:
        an inlet portion extending between a first end and a second end opposite said first end, with said inlet portion defining a turbine housing inlet configured to be in fluid communication with the internal combustion engine at said first end for receiving exhaust gas from the internal combustion engine; and
        a volute portion extending from said inlet portion at said second end and extending circumferentially about said axis, said volute portion having a first volute wall and a second volute wall spaced from said first volute wall along said axis, and with said volute portion defining,
            a turbine housing interior in fluid communication with said turbine housing inlet for receiving exhaust gas from said turbine housing inlet, and
            a turbine housing outlet in fluid communication with said turbine housing interior for discharging exhaust gas from said turbine housing interior,
    with said turbine housing having a tongue integrally cast with said turbine housing and separating said turbine housing inlet and said turbine housing interior, said tongue having,
        a first tongue portion extending from said first volute wall substantially toward said second volute wall along said axis,
        a second tongue portion extending from said first tongue portion substantially circumferentially about said axis, and
        a third tongue portion extending from said second tongue portion substantially toward said second volute wall along said axis to reduce high cycle fatigue of said turbine wheel.

2. The turbocharger as set forth in claim 1, wherein said first, second, and third tongue portions together define a radial cross-section between said first and second volute walls, with said radial cross-section of said first, second, and third tongue portions remaining constant circumferentially along a length of said tongue.

3. The turbocharger as set forth in claim 1, wherein said first and second volute walls have a volute width defined therebetween, with said first tongue portion extending from said first volute wall 50% to 90% of said volute width toward said second volute wall.

4. The turbocharger as set forth in claim 1, wherein said second tongue portion extends 10 to 40 degrees about said axis.

5. The turbocharger as set forth in claim 1, wherein said first and second volute walls have a volute width defined therebetween, with said third tongue portion extending from said second tongue portion 10% to 50% of said volute width toward said second volute wall.

6. The turbocharger as set forth in claim 1, wherein said third tongue portion extends completely to said second volute wall.

7. The turbocharger as set forth in claim 1, wherein said first, second, and third tongue portions together establish an undulating configuration.

8. The turbocharger as set forth in claim 1, wherein said first tongue portion extends from said first volute wall normally to said first volute wall, said second tongue portion extends from said first tongue portion normally to said first tongue portion, and said third tongue portion extends from said second tongue portion normally to said second tongue portion.

9. The turbocharger as set forth in claim 8, wherein said third tongue portion extends to said second volute wall such that said third tongue portion is normal to said second volute wall.

10. The turbocharger as set forth in claim 1, wherein said tongue further has a fourth tongue portion extending from said third tongue portion substantially circumferentially about said axis, and a fifth tongue portion extending from said fourth tongue portion substantially toward said second volute wall along said axis.

11. The turbocharger as set forth in claim 10, wherein said first tongue portion extends from said first volute wall at a first circumferential position, and said fifth tongue portion extends toward said second volute wall at a second circumferential position different from said first circumferential position.

12. The turbocharger as set forth in claim 10, wherein said first tongue portion extends from said first volute wall at a first circumferential position and said fifth tongue portion extends toward said second volute wall at said first circumferential position.

13. The turbocharger as set forth in claim 10, wherein said fifth tongue portion extends completely to said second volute wall.

14. The turbocharger as set forth in claim 10, wherein said fourth and fifth tongue portions together establish an undulating configuration.

15. The turbocharger as set forth in claim 10, wherein said fourth tongue portion extends from said third tongue portion normally to said third tongue portion, and said fifth tongue portion extends from said forth tongue portion normally to said fourth tongue portion.

16. The turbocharger as set forth in claim 15, wherein said fifth tongue portion extends to said second volute wall such that said fifth tongue portion is normal to said second volute wall.

17. A turbine housing for a turbocharger having a turbine wheel rotatable about an axis, said turbine housing comprising:
   an inlet portion extending between a first end and a second end opposite said first end, with said inlet portion defining a turbine housing inlet configured to be in fluid communication with an internal combustion engine at said first end for receiving exhaust gas from the internal combustion engine;
   a volute portion extending from said inlet portion at said second end and extending circumferentially about the axis, said volute portion having a first volute wall and a second volute wall spaced from said first volute wall along the axis, and with said volute portion defining,
      a turbine housing interior in fluid communication with said turbine housing inlet for receiving exhaust gas from said turbine housing inlet, and
      a turbine housing outlet in fluid communication with said turbine housing interior for discharging exhaust gas from said turbine housing interior; and
   a tongue integrally cast with at least one of said inlet portion and said volute portion and separating said turbine housing inlet and said turbine housing interior, said tongue having,
      a first tongue portion extending from said first volute wall substantially toward said second volute wall along the axis,
      a second tongue portion extending from said first tongue portion substantially circumferentially about the axis, and
      a third tongue portion extending from said second tongue portion substantially toward said second volute wall along the axis to reduce high cycle fatigue of the turbine wheel.

18. The turbine housing as set forth in claim 17, wherein said first, second, and third tongue portions together define a radial cross-section between said first and second volute walls, with said radial cross-section of said first, second, and third tongue portions remaining constant circumferentially along a length of said tongue.

19. The turbine housing as set forth in claim 17, wherein said first tongue portion extends from said first volute wall normally to said first volute wall, said second tongue portion extends from said first tongue portion normally to said first tongue portion, and said third tongue portion extends from said second tongue portion normally to said second tongue portion.

* * * * *